United States Patent
Lei et al.

(10) Patent No.: US 12,258,269 B1
(45) Date of Patent: Mar. 25, 2025

(54) EV-GRADE LITHIUM SULFIDE AND PREPARATION METHOD FOR THE SAME

(71) Applicant: TIANQI LITHIUM CORPORATION, Sichuan (CN)

(72) Inventors: Zhen Lei, Suining (CN); Chuan Xu, Suining (CN); Ge Chen, Suining (CN); Huan Tian, Suining (CN); Liu Yang, Suining (CN); Yibao Gao, Suining (CN); Xi Lu, Suining (CN)

(73) Assignee: TIANQI LITHIUM CORPORATION, Sichuan (CN)

( * ) Notice: Subject to any disclaimer, the term of this patent is extended or adjusted under 35 U.S.C. 154(b) by 0 days.

(21) Appl. No.: 18/774,114

(22) Filed: Jul. 16, 2024

(30) Foreign Application Priority Data

Sep. 20, 2023 (CN) .......................... 202311216614.9

(51) Int. Cl.
*C01B 17/36* (2006.01)

(52) U.S. Cl.
CPC .......... *C01B 17/36* (2013.01); *C01P 2004/61* (2013.01); *C01P 2006/40* (2013.01); *C01P 2006/80* (2013.01)

(58) Field of Classification Search
None
See application file for complete search history.

(56) References Cited

U.S. PATENT DOCUMENTS

2014/0037535 A1  2/2014  Miyashita

FOREIGN PATENT DOCUMENTS

| CN | 112520703 A | 3/2021 | | |
|----|----|----|----|----|
| CN | 112678780 A | 4/2021 | | |
| CN | 112678781 A | 4/2021 | | |
| CN | 113415812 A | 9/2021 | | |
| CN | 113788458 A | * 12/2021 | | |
| CN | 115133117 A | * 9/2022 | ............. | B82Y 30/00 |
| CN | 115838287 A | * 3/2023 | ............. | C01B 17/22 |
| CN | 116040587 A | 5/2023 | | |
| CN | 116216652 A | * 6/2023 | | |
| TW | I366554 B | 6/2012 | | |
| WO | 2016/119481 A1 | 8/2016 | | |

OTHER PUBLICATIONS

English translation of CN-115133117-A Description. (Year: 2022).*
English translation of CN-115838287-A Description. (Year: 2023).*
English translation of CN-113788458-A Description. (Year: 2021).*

(Continued)

*Primary Examiner* — Anthony J Zimmer
*Assistant Examiner* — Zachary John Baum
(74) *Attorney, Agent, or Firm* — Oliff PLC

(57) ABSTRACT

A preparation method for EV-grade lithium sulfide includes: mixing and reacting sulfur powder, metallic lithium and a lithium-containing additive to obtain a crude lithium sulfide product, and then pulverizing and calcining the crude lithium sulfide product to remove excess sulfur powder to obtain the EV-grade lithium sulfide. The method being used for preparing the lithium sulfide is advantaged in simple process, strong operability, large-scale production, and being capable to meet the requirements for safe operation and EV-grade lithium sulfide, without toxic gas generation and secondary pollution.

19 Claims, 1 Drawing Sheet

(56) References Cited

OTHER PUBLICATIONS

English translation of CN-116216652-A Description. (Year: 2023).*
Boyer, Rodney Welsch, Gerhard Collings, E.W.. (1994). Materials Properties Handbook—Titanium Alloys—Alloy Data Sheet Contents. (p. 13). ASM International. Retrieved from https://app.knovel.com/hotlink/pdf/id:kt007TGFU2/materials-properties/alloy-data-sheet-contents. (Year: 1994).*
MSE Supplies, LLC. 100g Li2S, Ampcera Lithium Sulfide Powder, 99.9% Purity, Pass 200 Mesh. Retrieved from https://www.msesupplies.com/products/li2s-lithium-sulfide-99-9-metals-basis-200-mesh-powder?srsltid=AfmBOorSvc9b9zzZrulyCtIU13pf7AR4ktGfF37MHr9MN8GKDWjRe9EJ on Jan. 13, 2025. (Year: 2025).*
Jan. 23, 2024 Search Report issued in Chinese Patent Application No. 2023112166149.

* cited by examiner

EV-GRADE LITHIUM SULFIDE AND PREPARATION METHOD FOR THE SAME

CROSS-REFERENCE TO RELATED APPLICATIONS

This application claims the rights and interests and priority of Chinese Patent Application CN 2023112166149 filed on Sep. 20, 2023, and this application is hereby incorporated by reference in its entirety for all other purposes.

FIELD OF THE INVENTION

The invention relates to EV-grade lithium sulfide and a preparation method therefor, and pertains to the technical field of lithium battery materials.

BACKGROUND OF THE INVENTION

Lithium ion batteries are an important renewable energy storage device, their performance and cycling life are very important for the reliable operation of electric vehicles and energy storage systems. Because solid-state lithium ion batteries have high safety, high energy density, long cycling life, strong anti-polarization ability, environmental protection and the like, they have broad application prospects in electric vehicles, energy storage systems, mobile devices and the like. Solid electrolytes, instead of traditional liquid electrolytes, are used in the solid-state lithium ion batteries, and therefore such solid-state lithium ion batteries have higher safety. Lithium sulfide is a lithium source material of the solid electrolytes, and its quality has an important influence on the performance of lithium ion batteries. However, the existing synthesis methods of the lithium sulfide have some problems, such as high impurity, low whiteness and high cost, which seriously limits the development of the solid-state lithium ion batteries.

The existing preparation methods for high-purity lithium sulfide are mainly as follows: (1) for Patent CN112678780A, lithium sulfide is prepared by a high-temperature carbon reduction process, and the lithium sulfide prepared by the preparation method is grayish in color and low in whiteness; (2) for Patent CN113415812A and Japanese Patent TWI366554B, lithium sulfide is prepared through reaction of a lithium source and hydrogen sulfide, and highly toxic hydrogen sulfide gas is used in the preparation method, so a high process safety is required; and (3) for Patent CN112678781A, lithium sulfide is prepared by mixing a lithium source with a sulfur source and adding hydrazine hydrate, and the color of the prepared lithium sulfide is white, but its purity is low and only can reach 95%. (4) In addition, for Patent CN116040587A, lithium sulfide is prepared through reaction of battery-grade metallic lithium and sulfur powder, and the battery-grade metallic lithium needs to be used in the preparation method, so raw materials are required to have high purity. (5) Patent CN112520703A discloses an environmentally-friendly preparation method for lithium sulfide, and the method includes the following steps: well mixing a lithium-containing substance with elemental sulfur in an inert atmosphere, and transferring the mixture into a reactor; vacuumizing the reactor by a vacuum pump and introducing a specified amount of hydrogen; heating the mixture to a set temperature at a specified rate and keeping it for a specified time; cooling the temperature of the reactor and collecting and vacuumizing gas in the reactor; and opening the reactor in the inert atmosphere to obtain a lithium sulfide powder, where the lithium-containing substance is any one or more of lithium amino, lithium imide, and lithium nitride. However, for Patent CN112520703A, combustible gas $H_2$ needs to be used and its reaction is exothermic, so experimental equipment has high requirements with large safety risks. (6) Patent CN116216652A discloses a preparation method for lithium sulfide, and the preparation method includes the following steps: reacting low-cost
nitrogen with metallic lithium in the inert atmosphere or under vacuum to prepare lithium nitride; and controlling the residual amount of metallic lithium in the lithium nitride within a preset safety threshold; and mixing the prepared lithium nitride with elemental sulfur in a proportion to obtain lithium sulfide through reaction. However, in the preparation method, requirements for raw material parameters are high, and a reaction process is difficult to control, so it is difficult to achieve scale production.

BRIEF SUMMARY OF THE INVENTION

The first purpose of the invention is to provide a new preparation method for EV-grade lithium sulfide.

In order to achieve the first purpose of the invention, the preparation method for EV-grade lithium sulfide includes:
mixing and reacting sulfur powder, metallic lithium and a lithium-containing additive to obtain a crude lithium sulfide product, and then pulverizing and calcining the crude lithium sulfide product to remove excess sulfur powder to obtain the EV-grade lithium sulfide.

The invention has low requirements for raw materials, and the raw material of metallic lithium may be industrial-grade metallic lithium, and the purity of lithium is more than 99%.

In a specific embodiment, the molar ratio of the sulfur powder, the metallic lithium and the lithium-containing additive is 1:2:0.1-0.3.

In a specific embodiment, the particle size of the sulfur powder ranges from 70-80 microns, and the particle size of the lithium-containing additive is 80-90 microns.

In a specific embodiment, a reaction temperature is 100° C.-180° C.

In a specific embodiment, the lithium-containing additive is at least one of lithium hydride, lithium nitride and lithium carbide.

In a specific embodiment, the reaction further includes stirring, a stirring time is 4-8 hours, and a stirring speed is 20-40 rpm; preferably, the reaction temperature is 140° C., the stirring time is 6 hours, and the stirring speed is 20 rpm.

In a specific embodiment, the method further includes screening the crude lithium sulfide product; pulverizing the screened crude lithium sulfide product with a particle size of less than 20 meshes; and returning the crude lithium sulfide product with a particle size of more than 20 meshes as a raw material to a reaction step.

In a specific embodiment, a pulverizing speed is 20,000-25,000 rpm, and a pulverizing time is 1-3 minutes.

In a specific embodiment, the particle size of the crude lithium sulfide product before calcination ranges from 20-50 microns.

In a specific embodiment, the calcination is performed at 400° C.-600° C. for 3-5 hours, and preferably, a calcining temperature is 600° C. and a calcining time is 4 hours.

In a specific embodiment, the method further includes wet ball milling: performing wet ball milling on the calcined crude lithium sulfide product, where a solvent for wet ball milling is at least one of isopropanol and n-propanol, ball milling parameters include a ball milling speed of 300-500 rpm and a ball milling time of 8-12 hours, and the mass ratio of the ball, crude lithium sulfide product and solvent during the ball milling is 4-1:1:1-0.1.

In a specific embodiment, the solvent for wet ball milling is isopropanol, the ball milling speed is 400 rpm, and the ball milling time is 8 hours.

In a specific embodiment, the mass ratio of the ball, crude lithium sulfide product and solvent during the ball milling is 1:1:0.8.

In a specific embodiment, the method further includes cleaning and drying: cleaning the lithium sulfide subjected to ball milling with at least one of n-hexane, n-pentane and cyclohexane, and then stirring, heating and drying the lithium sulfide to obtain an EV-grade high-purity lithium sulfide product; and preferably, the cleaning with n-hexane is performed by 2-3 times.

In a specific embodiment, the reaction, cleaning and drying are performed in a protective atmosphere; and the protective atmosphere is preferably at least one of nitrogen, argon and helium.

In a specific embodiment, a drying temperature is 80° C.-100° C., a stirring speed is 30-60 rpm, and a drying time is 4-8 hours.

In a specific embodiment, the reaction is performed in a titanium device, and the drying is performed in a titanium TA2 device.

The second purpose of the invention is to provide new EV-grade lithium sulfide.

In order to achieve the second purpose of the invention, the EV-grade lithium sulfide is prepared by the preparation method for EV-grade lithium sulfide, where the purity of the EV-grade lithium sulfide is more than 99.9% and the whiteness thereof is above 80; and preferably, the purity of the EV-grade lithium sulfide is more than 99.95%, the whiteness thereof is above 80, and the D50 particle size thereof is within 15 microns.

Compared with the prior art, the invention has the following beneficial effects:

The whiteness of the product according to the invention can reach above 80.

A specific proportion of additives is added when the metallic lithium reacts with the sulfur powder to prepare lithium sulfide; the existence of a specific proportion of lithium-containing additives greatly relieves the phenomenon of insufficient reaction caused by agglomeration during the reaction of the metallic lithium, and the purity of the product is more than 99.9%; in addition, the addition of additives makes the agglomerated crude lithium sulfide form a loose skeleton structure, and the product is easy to pulverize, which reduces the risk of secondary violent reaction in the pulverizing process and improves the conditions where vacuum environment is required during preparation process.

The method of the invention being used for preparing the lithium sulfide is advantaged in simple process, strong operability, large-scale production, and being capable to meet the requirements for safe operation and EV-grade lithium sulfide, without toxic gas generation and secondary pollution.

In the invention, high-purity lithium sulfide can also be prepared by industrial grade lithium, with a low cost, with low cost.

DETAILED DESCRIPTION OF THE INVENTION

In order to achieve the first purpose of the invention, the preparation method for EV-grade lithium sulfide includes:
mixing and reacting sulfur powder, metallic lithium and a lithium-containing additive to obtain a crude lithium sulfide product, and then pulverizing and calcining the crude lithium sulfide product to remove excess sulfur powder to obtain the EV-grade lithium sulfide.

The invention has low requirements for raw materials, and the raw material of metallic lithium may be industrial-grade metallic lithium, and the purity of lithium is more than 99%.

The EV-grade lithium sulfide is battery grade lithium sulfide.

Figure 1:
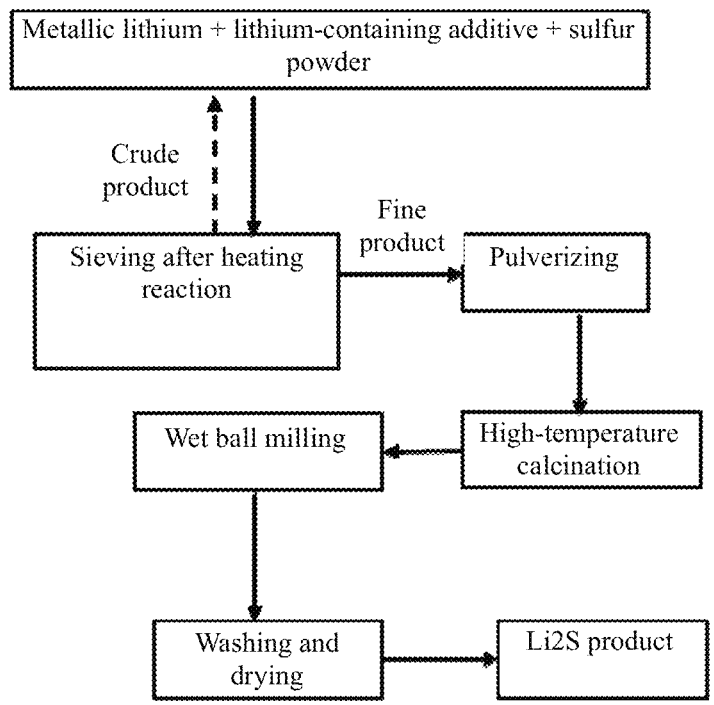
FIG. 1 is a process flow diagram according to the invention.

As shown in FIG. 1, in a specific embodiment, after the reaction, the lithium sulfide can be screened according to the particle size of the crude lithium sulfide product: large and hard materials are returned to a reaction process, and lithium sulfide with a small particle size is pulverized. A 20-mesh sieve (830 microns) serves a screening tool.

The reaction process of the invention can be performed in a drying room, and has the low requirements for environmental atmosphere, but gas in a reaction device needs to be an inert gas. The inert gas is a gas that does not react with the material of the invention.

In a specific embodiment, the molar ratio of the sulfur powder, the metallic lithium and the lithium-containing additive is 1:2:0.1-0.3.

In a specific embodiment, the particle size of the sulfur powder ranges from 70-80 microns, and the particle size of the lithium-containing additive is 80-90 microns.

In a specific embodiment, a reaction temperature is 100° C.-180° C.

In a specific embodiment, the lithium-containing additive is at least one of lithium hydride, lithium nitride and lithium carbide.

In a specific embodiment, the reaction further includes stirring, a stirring time is 4-8 hours, and a stirring speed is 20-40 rpm; preferably, the reaction temperature is 140° C., the stirring time is 6 hours, and the stirring speed is 20 rpm.

In a specific embodiment, the method further includes screening the crude lithium sulfide product; pulverizing the screened crude lithium sulfide product with a particle size of less than 20 meshes; and returning the crude lithium sulfide product with a particle size of more than 20 meshes as a raw material to a reaction step.

In a specific embodiment, a pulverizing speed is 20,000-25,000 rpm, and a pulverizing time is 1-3 minutes.

In a specific embodiment, the particle size of the crude lithium sulfide product before calcination ranges from 20-50 microns.

In a specific embodiment, the calcination is performed at 400° C.-600° C. for 3-5 hours, and preferably, a calcining temperature is 600° C. and a calcining time is 4 hours.

In a specific embodiment, the method further includes wet ball milling: performing wet ball milling on the calcined crude lithium sulfide product, where a solvent for wet ball milling is at least one of isopropanol and n-propanol, ball milling parameters include a ball milling speed of 300-500 rpm and a ball milling time of 8-12 hours, and the mass ratio of the ball, crude lithium sulfide product and solvent during the ball milling is 4-1:1:1-0.1.

In a specific embodiment, the solvent for wet ball milling is isopropanol, the ball milling speed is 400 rpm, and the ball milling time is 8 hours.

In a specific embodiment, the mass ratio of the ball, crude lithium sulfide product and solvent during the ball milling is 1:1:0.8.

In a specific embodiment, the method further includes cleaning and drying: cleaning the lithium sulfide subjected to ball milling with at least one reagent of n-hexane, n-pentane and cyclohexane, and then stirring, heating and drying the lithium sulfide to obtain an EV-grade high-purity lithium sulfide product.

In a specific embodiment, the reaction, cleaning and drying are performed in a protective atmosphere; and the protective atmosphere is preferably at least one of nitrogen, argon and helium.

In a specific embodiment, a drying temperature is 80° C.-100° C., a stirring speed is 30-60 rpm, and a drying time is 4-8 hours.

In a specific embodiment, the reaction is performed in a titanium device, and the drying is performed in a titanium TA2 device.

The second purpose of the invention is to provide new EV-grade lithium sulfide.

In order to achieve the second purpose of the invention, the EV-grade lithium sulfide is prepared by the preparation method for EV-grade lithium sulfide, where the purity of the EV-grade lithium sulfide is more than 99.9% and the whiteness thereof is above 80; and preferably, the purity of the EV-grade lithium sulfide is more than 99.95%, the whiteness thereof is above 80, and the D50 particle size thereof is within 15 microns.

The following will make a further description for the specific embodiments of the invention with reference to examples, but this does not limit the invention to the scope of the embodiments.

Example 1

(1) Based on the molar ratio of Li:S:LiH=1:2:0.2, an industrial-grade metallic lithium sheet with a thickness of 300 microns, a sulfur powder with a particle size ranging from 70-75 microns, and lithium hydride with a particle size ranging from 80-85 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

$2Li+S=Li_2S$ $2LiH+S=Li_2S+H_2\uparrow$ (2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to wet ball milling with isopropanol as a solvent, where ball milling parameters include a ball milling speed of 400 rpm, a ball milling time of 8 hours, and a ratio of ball, material and solvent of 1:1:0.8; and (4) the lithium sulfide subjected to ball milling was cleaned with n-hexane, and stirred, heated and dried in an inert protective gas to obtain a lithium sulfide product numbered as YP-1, where a stirring speed is 30 rpm, a stirring time is 30 min, a heating and drying temperature is 100° C., and a drying time is 6 hours.

Figure 2:
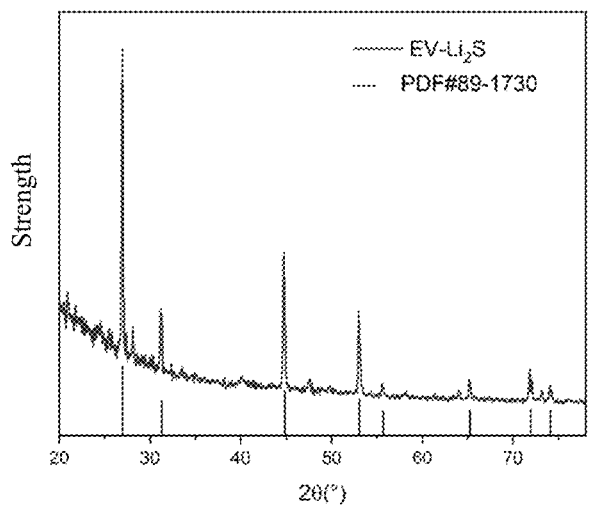
FIG. 2 shows an XRD pattern of Example 1.

The composition parameters of the obtained product are shown in Table 1, its purity is 99.97%, and its XRD pattern is shown in FIG. 2.

Example 2

(1) Based on the molar ratio of Li:S:Li$_3$N=1:2:0.2, an industrial-grade metallic lithium sheet with a thickness of 300 microns, a sulfur powder with a particle size ranging from 70-75 microns, and lithium hydride with a particle size ranging from 80-85 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

$2Li+S=Li_2S$ $2Li_3N+3S=3Li_2S+N_2\uparrow$ (2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to wet ball milling with isopropanol as a solvent, where ball milling parameters include a ball milling speed of 400 rpm, a ball milling time of 8 hours, and a ratio of ball, material and solvent of 1:1:0.8; and (4) The lithium sulfide subjected to ball milling was cleaned with n-hexane, and stirred, heated and dried in an inert protective gas to obtain a lithium sulfide product numbered as YP-2, where a stirring speed is 30 rpm, a stirring time is 30 min, a heating and drying temperature is 100° C., and a drying time is 6 hours.

The composition parameters of the obtained product are shown in Table 1, and its purity is 99.98%.

Example 3

(1) Based on the molar ratio of Li:S:Li$_2$C$_2$=1:2:0.2, an industrial-grade metallic lithium sheet with a thickness of 300 microns, a sulfur powder with a particle size ranging from 70-75 microns, and lithium hydride with a particle size ranging from 80-85 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

$2Li+S=Li_2S$ $Li_2C_2+5S=Li_2S+2CS_2 \text{ (g)}$ (2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to wet ball milling with isopropanol as a solvent, where ball milling parameters include a ball milling speed of 400 rpm, a ball milling time of 8 hours, and a ratio of ball, material and solvent of 1:1:0.8; and (4) The lithium sulfide subjected to ball milling was cleaned with n-hexane, and stirred, heated and dried in an inert protective gas to obtain a lithium sulfide product numbered as YP-3, where a stirring speed is 30 rpm, a stirring time is 30 min, a heating and drying temperature is 100° C., and a drying time is 6 hours.

The composition parameters of the obtained product are shown in Table 1, and its purity is 99.96%.

Example 4

(1) Based on the molar ratio of Li:S:LiH=1:2:0.2, an industrial-grade metallic lithium sheet with a thickness of 300 microns, a sulfur powder with a particle size ranging from 70-75 microns, and lithium hydride with a particle size ranging from 80-85 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

$$2Li+S=Li_2S$$

$$2LiH+S=Li_2S+H_2\uparrow$$

(2) the crude lithium sulfide product was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to wet ball milling with isopropanol as a solvent, where ball milling parameters include a ball milling speed of 400 rpm, a ball milling time of 8 hours, and a ratio of ball, material and solvent of 1:1:0.8; and (4) the lithium sulfide subjected to ball milling was cleaned with n-hexane, and stirred, heated and dried in an inert protective gas to obtain a lithium sulfide product numbered as YP-4, where a stirring speed is 30 rpm, a stirring time is 30 min, a heating and drying temperature is 100° C., and a drying time is 6 hours.

The composition parameters of the obtained product are shown in Table 1, and its purity is 99.97%.

Comparative Example 1

(1) Based on the molar ratio of Li:S=1:2, an industrial-grade metallic lithium sheet with a thickness of 300 microns and a sulfur powder with a particle size ranging from 70-75 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

$$2Li+S=Li_2S$$

$$2LiH+S=Li_2S+H_2\uparrow$$

(2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to wet ball milling with isopropanol as a solvent, where ball milling parameters include a ball milling speed of 400 rpm, a ball milling time of 8 hours, and a ratio of ball, material and solvent of 1:1:0.8; and (4) the lithium sulfide subjected to ball milling was cleaned with n-hexane, and stirred at a stirring speed of 30 rpm, heated and dried in an inert protective gas to obtain a lithium sulfide product numbered as DB-1, where a stirring time is 30 min, a heating and drying temperature is 100° C., and a drying time is 6 hours.

The composition parameters of the obtained product are shown in Table 1, and its purity is 99.73%.

Comparative Example 2

(1) Based on the molar ratio of Li:S:LiH=1:2:0.2, an industrial-grade metallic lithium sheet with a thickness of 300 microns, a sulfur powder with a particle size ranging from 70-75 microns, and lithium hydride with a particle size ranging from 80-85 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

$$2Li+S=Li_2S$$

$$2LiH+S=Li_2S+H_2\uparrow$$

(2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to dry ball milling, where ball milling parameters include a ball milling speed of 400 rpm, a ball milling time of 8 hours, and a ball-to-material ratio of 1:1; and (4) the lithium sulfide subjected to ball milling was cleaned with n-hexane, and stirred at a stirring speed of 30 rpm, heated and dried in an inert protective gas to obtain a lithium sulfide product numbered as DB-2, where a stirring time is 30 min, a heating and drying temperature is 100° C., and a drying time is 6 hours.

The composition parameters of the obtained product are shown in Table 1, and its purity is 99.85%.

Comparative Example 3

(1) Based on the molar ratio of Li:S=1:2, an industrial-grade metallic lithium sheet with a thickness of 300 microns and a sulfur powder with a particle size ranging from 70-75 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

2Li+S=Li$_2$S (2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to dry ball milling, where ball milling parameters include a ball milling speed of 400 rpm, a ball milling time of 8 hours, and a ball-to-material ratio of 1:1; and (4) the lithium sulfide subjected to ball milling was cleaned with n-hexane, and stirred at a stirring speed of 30 rpm, heated and dried in an inert protective gas to obtain a lithium sulfide product numbered as DB-3, where a stirring time is 30 min, a heating and drying temperature is 100° C., and a drying time is 6 hours.

The composition parameters of the obtained product are shown in Table 1, and its purity is 99.5%.

Comparative Example 4

(1) Based on the molar ratio of Li:S:LiH=1:2:1, an industrial-grade metallic lithium sheet with a thickness of 300 microns, a sulfur powder with a particle size ranging from 70-75 microns, and lithium hydride with a particle size ranging from 80-85 microns were weighed; in a nitrogen atmosphere, the raw materials were stirred for 6 hours at a stirring speed of 20 rpm and reacted with each other at a reaction temperature of 140° C. to obtain a crude lithium sulfide product, where a reaction equation is as follows:

2Li+S=Li$_2$S

2LiH+S=Li$_2$S+H$_2$↑

(2) after the reaction, the crude lithium sulfide product was screened, where the crude lithium sulfide product with a particle size greater than 20 meshes could be used as the raw material for the next reaction, and the crude lithium sulfide product with a particle size smaller than 20 meshes was pulverized in a pulverizer for 2 min at a pulverizing speed of 25,000 rpm; the pulverized crude lithium sulfide product with a particle size ranging from 20-40 microns was calcined at a high temperature to remove excess sulfur powder, where a calcining temperature is 600° C. and a calcining time is 5 hours;

(3) the calcined crude lithium sulfide product was subjected to wet ball milling with isopropanol as a solvent, where ball milling parameters include a ball milling speed of 400 rpm, a ball milling time of 8 hours, and a ratio of ball, material and solvent of 1:1:0.8; and (4) The lithium sulfide subjected to ball milling was cleaned with n-hexane, and stirred at a stirring speed of 30 rpm, heated and dried in an inert protective gas to obtain a lithium sulfide product numbered as DB-4, where a stirring time is 30 min, a heating and drying temperature is 100° C., and a drying time is 6 hours.

The composition parameters of the obtained product are shown in Table 1, and its purity is 98.36%.

TABLE 1

Parameters for examples and comparative examples

| No. | Purity (%) | Na + K + Ca + Mg + Si + Al + Fe + Zn + Ni + Cr + Mn + Co + Pb + Ti % | Whiteness (%) | D50 particle size (nm) |
|---|---|---|---|---|
| YP-1 | 99.97 | <0.01 | 87.1 | 183 |
| YP-2 | 99.98 | <0.01 | 88.3 | 174 |
| YP-3 | 99.96 | <0.01 | 87.4 | 243 |
| YP-4 | 99.97 | <0.01 | 86.3 | 182 |
| DB-1 | 99.73 | <0.01 | 78.3 | 221 |
| DB-2 | 99.85 | <0.01 | 81.6 | 1850 |
| DB-3 | 99.50 | <0.01 | 79.5 | 2102 |
| DB-4 | 98.36 | <0.01 | 68.2 | 420 |

The invention claimed is:

1. A preparation method for EV-grade lithium sulfide, comprising:
mixing and reacting sulfur powder, metallic lithium and a lithium-containing additive to obtain a crude lithium sulfide product, and then pulverizing and calcining the crude lithium sulfide product to remove excess sulfur powder to obtain the EV-grade lithium sulfide, wherein the lithium-containing additive is at least one of lithium hydride, lithium nitride and lithium carbide; and
the molar ratio of the sulfur powder, the metallic lithium and the lithium-containing additive is 1:2:0.1-0.3.

2. The preparation method for EV-grade lithium sulfide according to claim 1, wherein the particle size of the sulfur powder ranges from 70-80 microns, and the particle size of the lithium-containing additive is 80-90 microns.

3. The preparation method for EV-grade lithium sulfide according to claim 1, wherein a reaction temperature is 100° C.-180° C.

4. The preparation method for EV-grade high-purity lithium sulfide according to claim 1, wherein the reaction further comprises stirring, a stirring time is 4-8 hours, and a stirring speed is 20-40 rpm.

5. The preparation method for EV-grade lithium sulfide according to claim 1, wherein a reaction temperature is 140° C., a stirring time is 6 hours, and a stirring speed is 20 rpm.

6. The preparation method for EV-grade lithium sulfide according to claim 1, further comprising: screening the crude lithium sulfide product; pulverizing the screened crude lithium sulfide product with a particle size of less than 20 meshes; and returning the crude lithium sulfide product with a particle size of more than 20 meshes as a raw material to a reaction step.

7. The preparation method for EV-grade lithium sulfide according to claim 1, wherein a pulverizing speed is 20,000-25,000 rpm, and a pulverizing time is 1-3 minutes.

8. The preparation method for EV-grade lithium sulfide according to claim 1, wherein the particle size of the crude lithium sulfide product before calcination ranges from 20-50 microns.

9. The preparation method for EV-grade lithium sulfide according to claim 1, wherein the calcination is performed at 400° C.-600° C. for 3-5 hours.

10. The preparation method for EV-grade lithium sulfide according to claim 9, wherein a calcining temperature is 600° C. and a calcining time is 4 hours.

11. The preparation method for EV-grade lithium sulfide according to claim 1, further comprising wet ball milling: performing wet ball milling on the calcined crude lithium sulfide product, wherein a solvent for wet ball milling is at least one of isopropanol and n-propanol, ball milling parameters comprise a ball milling speed of 300-500 rpm and a ball milling time of 8-12 hours, and the mass ratio of the ball, crude lithium sulfide product and solvent during the ball milling is 4-1:1:1-0.1.

12. The preparation method for EV-grade lithium sulfide according to claim 11, wherein the solvent for wet ball milling is isopropanol, the ball milling speed is 400 rpm, and the ball milling time is 8 hours.

13. The preparation method for EV-grade lithium sulfide according to claim 11, wherein the mass ratio of the ball, crude lithium sulfide product and solvent during the ball milling is 1:1:0.8.

14. The preparation method for EV-grade lithium sulfide according to claim 11, further comprising cleaning and drying: cleaning the lithium sulfide subjected to ball milling with at least one reagent of n-hexane, n-pentane and cyclohexane, and then stirring, heating and drying the lithium sulfide to obtain an EV-grade high-purity lithium sulfide product.

15. The preparation method for EV-grade lithium sulfide according to claim 14, wherein the cleaning indicates stirring and cleaning the lithium sulfide for 2-3 times with n-hexane.

16. The preparation method for EV-grade lithium sulfide according to claim 14, wherein the reaction, cleaning and drying are performed in a protective atmosphere.

17. The preparation method for EV-grade lithium sulfide according to claim 16, wherein the protective atmosphere is at least one of nitrogen, argon and helium.

18. The preparation method for EV-grade lithium sulfide according to claim 14, wherein a drying temperature is 80° C.-100° C., a stirring speed is 30-60 rpm, and a drying time is 4-8 hours.

19. The preparation method for EV-grade lithium sulfide according to claim 14, wherein the reaction is performed in a titanium device, and the drying is performed in a titanium TA2 device.

* * * * *